(12) United States Patent
Nishida

(10) Patent No.: US 8,875,988 B2
(45) Date of Patent: Nov. 4, 2014

(54) IMAGE FORMING APPARATUS, PRINT CONTROL METHOD, RECORDING MEDIUM

(75) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 32 days.

(21) Appl. No.: 12/538,466

(22) Filed: Aug. 10, 2009

(65) Prior Publication Data
US 2010/0051681 A1    Mar. 4, 2010

(30) Foreign Application Priority Data

Aug. 29, 2008   (JP) ................................. 2008-222127

(51) Int. Cl.
*G06F 17/00*   (2006.01)
*H04N 1/32*   (2006.01)
*H04N 1/44*   (2006.01)

(52) U.S. Cl.
CPC ......... *H04N 1/4413* (2013.01); *H04N 1/32625* (2013.01); *H04N 1/32657* (2013.01); *H04N 1/32646* (2013.01); *H04N 1/32662* (2013.01); *H04N 1/32635* (2013.01); *H04N 1/32651* (2013.01); *H04N 1/32667* (2013.01)
USPC ........ 235/375; 358/1.13; 358/1.14; 358/1.15; 358/1.16

(58) Field of Classification Search
USPC ............... 235/375; 358/1.14, 1.15, 1.16, 1.13
See application file for complete search history.

(56) References Cited

U.S. PATENT DOCUMENTS

| | | | |
|---|---|---|---|
| 6,724,492 B1 * | 4/2004 | Iwase et al. | 358/1.13 |
| 2002/0016921 A1 * | 2/2002 | Olsen et al. | 713/200 |
| 2002/0018921 A1 * | 2/2002 | Yamada et al. | 428/697 |
| 2003/0033368 A1 * | 2/2003 | Tominaga | 709/203 |
| 2004/0145768 A1 * | 7/2004 | Stringham | 358/1.14 |
| 2007/0268512 A1 | 11/2007 | Sakakibara | |

FOREIGN PATENT DOCUMENTS

| | | |
|---|---|---|
| EP | 1 862 897 A2 | 12/2007 |
| JP | 9-6562 | 1/1997 |
| JP | 10-191028 | 7/1998 |
| JP | 10-207661 | 8/1998 |

(Continued)

OTHER PUBLICATIONS

Office Action issued Aug. 27, 2013, in Japanese Patent Application No. 2008-222127.

(Continued)

*Primary Examiner* — Michael G Lee
*Assistant Examiner* — Tabitha Chedekel
(74) *Attorney, Agent, or Firm* — Oblon, Spivak, McClelland, Maier & Neustadt, L.L.P.

(57) ABSTRACT

An image forming apparatus including a printing-data-receiving unit configured to receive a printing-data-item including a user identification information item and a password, and to save the printing-data-item in a storage device; a user-authentication unit configured to receive input information specifying a user identification information item of a user, and to authenticate the user based on a managing unit that manages association information associating user identification information items with passwords; a list-display unit configured to cause a display device to display a list of printing-data-items each including the same user identification information item as that of the user; and a printing-control unit configured to execute a printing job of a printing-data-item selected from the list, wherein in the event that there is a printing-data-item that cannot be printed, the printing-control unit does not cancel a printing job of another printing-data-item that can be printed.

15 Claims, 18 Drawing Sheets

(56) References Cited

FOREIGN PATENT DOCUMENTS

| | | |
|---|---|---|
| JP | 2000-250731 | 9/2000 |
| JP | 2001-26169 | 1/2001 |
| JP | 2002-307794 | 10/2002 |
| JP | 2004-1320 | 1/2004 |
| JP | 2005-262864 | 9/2005 |
| JP | 2006-18654 | 1/2006 |
| JP | 2006-252411 | 9/2006 |
| JP | 2007-98786 | 4/2007 |
| JP | 2007-214700 | 8/2007 |
| JP | 2007-245377 | 9/2007 |
| JP | 2007-336155 A | 12/2007 |
| JP | 2008-28859 A | 2/2008 |
| JP | 2008-41044 | 2/2008 |
| JP | 2008-87270 A | 4/2008 |
| JP | 2008-103903 A | 5/2008 |

OTHER PUBLICATIONS

Japanese Office Action issued Jun. 25, 2013 in Patent Application No. 2008-222127.

Japanese Office Action issued Nov. 6, 2012, in Patent Application No. 2008-222127.

* cited by examiner

FIG.7

PLEASE SELECT JOB(S) TO PRINT OR DELETE.

AAA
PAGE:1    WED MAR 19 17:33:03 GMT+9:00 2008

BBB
PAGE:1    WED MAR 19 17:30:38 GMT+9:00 2008

CCC
PAGE:38   WED MAR 19 17:22:27 GMT+9:00 2008

DDD
PAGE:42   WED MAR 19 17:22:00 GMT+9:00 2008

EEE
PAGE:1    WED MAR 19 17:21:32 GMT+9:00 2008

SELECT ALL

PREVIOUS    NEXT

PRINT

DELETE

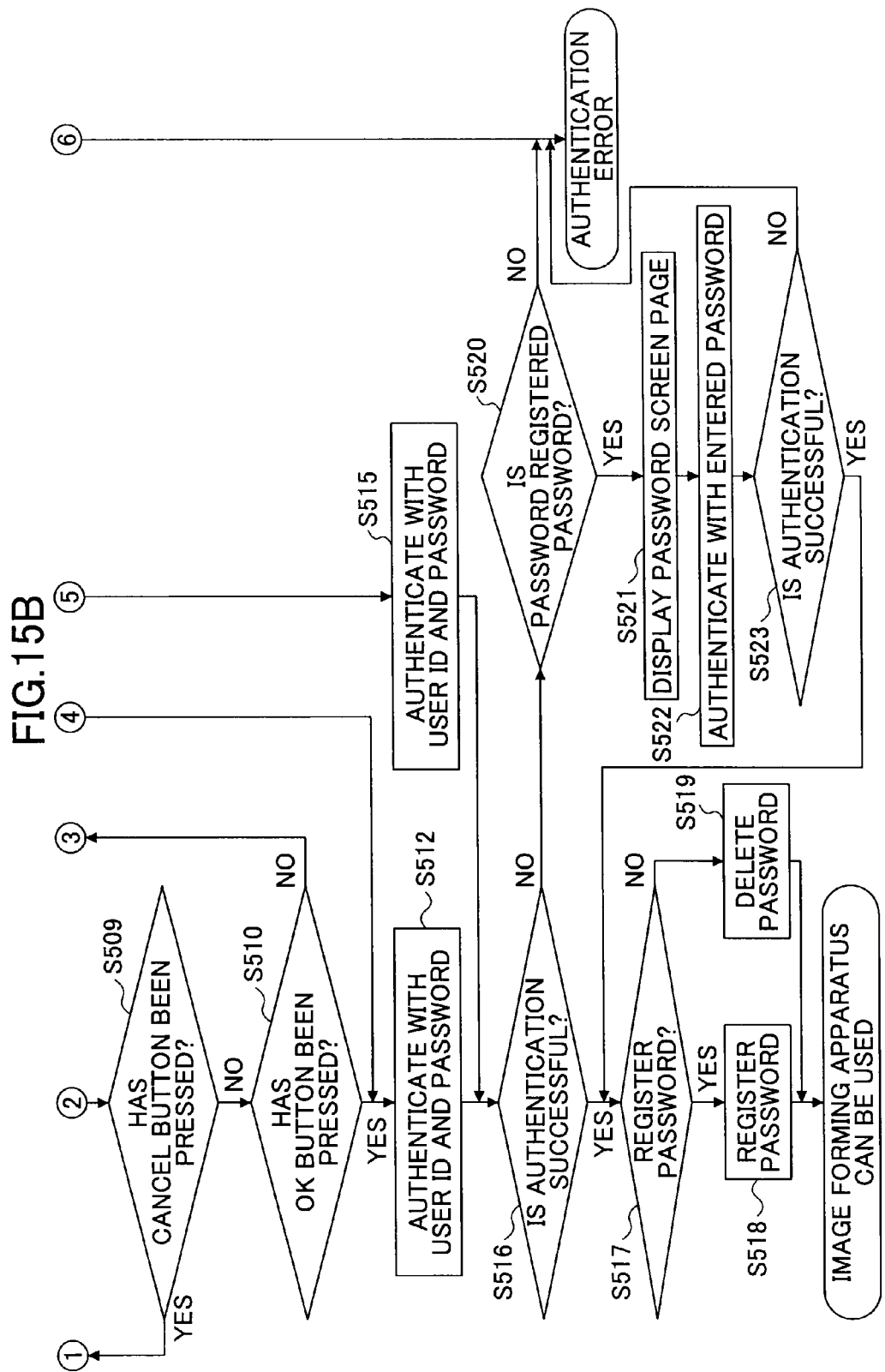

FIG.16

| USER NAME | CARD ID | PASSWORD | VALIDITY OF CARD |
|---|---|---|---|
| ... | ... | ... | VALID |
| ... | ... | ... | VALID |
| ... | ... | ... | INVALID |
| .. | .. | .. | .. |

170

IMAGE FORMING APPARATUS, PRINT CONTROL METHOD, RECORDING MEDIUM

BACKGROUND OF THE INVENTION

1. Field of the Invention

The present invention relates to image forming apparatuses, print control methods, and recording media, and more particularly to an image forming apparatus, a print control method, and a recording medium, for printing stored data.

2. Description of the Related Art

Conventionally, there is known an image forming apparatus that spools (stores) printing data received from a host computer, instead of immediately printing the data. When a logged-in user selects a printing data item from a list of spooled printing data items, the image forming apparatus prints the selected printing data.

Such an image forming apparatus can effectively prevent information leakage of a confidential document during the printing process.

Patent Document 1: Japanese Laid-Open Patent Application No. H10-207661
Patent Document 2: Japanese Laid-Open Patent Application No. 2006-018654

In the above-described image forming apparatus, when plural printing data items are selected from the list of spooled printing data items, printing jobs are continuously executed for the plural printing data.

When a printing condition requested by one of the printing data items cannot be satisfied (for example, when the sheet feeding tray specified by the printing data is out of paper or there is a shortage in toner of a color that is used in the printing data), all of the printing jobs for the succeeding printing data items are cancelled.

However, this does not mean that the printing data items succeeding the erroneous printing data item cannot be printed as well. That is, the printing data items may not necessarily have the same printing conditions. A sheet feeding tray that is not out of paper may be specified for a printing data item succeeding the erroneous printing data item.

Nevertheless, in the conventional technology, printing jobs of printing data that can be printed are cancelled because of a preceding erroneous printing data item, which incurs significant inconvenience to the user.

SUMMARY OF THE INVENTION

The present invention provides an image forming apparatus, a print control method, and a recording medium, in which one or more of the above-described disadvantages are eliminated.

A preferred embodiment of the present invention provides an image forming apparatus, a print control method, and a recording medium, capable of smoothly printing plural printing data items that are stored.

According to an aspect of the present invention, there is provided an image forming apparatus including a printing data receiving unit configured to receive a printing data item including a user identification information item and a password, and to save the printing data item in a storage device; a user authentication unit configured to receive input information specifying a user identification information item of a user, and to authenticate the user based on a managing unit that manages association information associating user identification information items with passwords; a list display unit configured to cause a display device to display a list of printing data items each including the same user identification information item as that of the user; and a printing control unit configured to execute a printing job of a printing data item selected from the list, wherein in the event that there is a printing data item that cannot be printed, the printing control unit does not cancel a printing job of another printing data item that can be printed.

According to an aspect of the present invention, there is provided a print control method performed by an image forming apparatus, including a printing data receiving step of receiving a printing data item including a user identification information item and a password, and saving the printing data item in a storage device; a user authentication step of receiving input information specifying a user identification information item of a user, and authenticating the user based on a managing unit that manages association information associating user identification information items with passwords; a list display step of causing a display device to display a list of printing data items each including the same user identification information item as that of the user; and a printing control step of executing a printing job of a printing data item selected from the list, wherein in the event that there is a printing data item that cannot be printed, a printing job of another printing data item that can be printed is not cancelled at the printing control step.

According to an aspect of the present invention, there is provided a computer-readable recording medium having recorded therein instructions for causing a computer to function as an image processing apparatus to perform a procedure including a printing data receiving step of receiving a printing data item including a user identification information item and a password, and saving the printing data item in a storage device; a user authentication step of receiving input information specifying a user identification information item of a user, and authenticating the user based on a managing unit that manages association information associating user identification information items with passwords; a list display step of causing a display device to display a list of printing data items each including the same user identification information item as that of the user; and a printing control step of executing a printing job of a printing data item selected from the list, wherein in the event that there is a printing data item that cannot be printed, a printing job of another printing data item that can be printed is not cancelled at the printing control step.

According to one embodiment of the present invention, an image forming apparatus, a print control method, and a recording medium are provided, which are capable of smoothly printing plural printing data items that are stored.

BRIEF DESCRIPTION OF THE DRAWINGS

Other objects, features and advantages of the present invention will become more apparent from the following detailed description when read in conjunction with the accompanying drawings, in which:

FIG. 7 is an example of a displayed printing data item list screen page;

FIGS. 15A and 15B show a flowchart for describing the processing procedures performed by the log-in control unit;

FIG. 16 illustrates an example of association information managed by an association information managing unit.

DETAILED DESCRIPTION OF THE PREFERRED EMBODIMENTS

A description is given, with reference to the accompanying drawings, of embodiments of the present invention.

Figure 1:
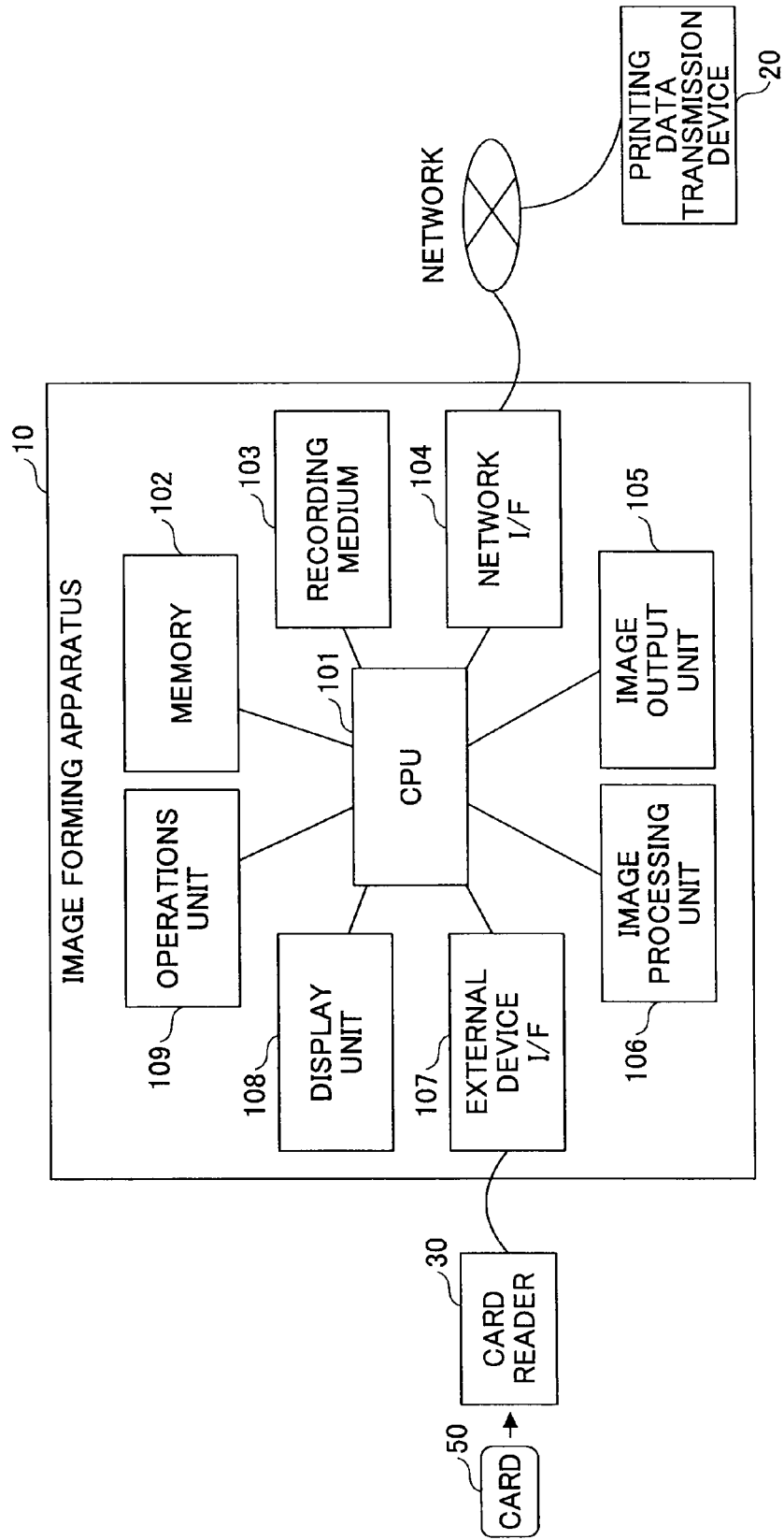
FIG. 1 illustrates a hardware configuration of an image forming apparatus according to an embodiment of the present invention.

FIG. 1 illustrates a hardware configuration of an image forming apparatus according to an embodiment of the present invention. As shown in FIG. 1, an image forming apparatus 10 is a printer, including a central processing unit (CPU) 101, a memory 102, a recording medium 103, a network interface (I/F) 104, an image output unit 105, an image processing unit 106, an external device I/F 107, a display unit 108, and an operations unit 109. In addition to a printing function, the image forming apparatus 10 may be a multifunction peripheral including at least one more function selected from a scan function, a copy function, and a fax function.

Programs for implementing functions of the image forming apparatus 10 are recorded (installed) in the non-volatile recording medium 103 such as a Hard Disk Drive (HDD). The recording medium 103 stores the installed programs, as well as necessary files and data. The memory 102 reads a program from the recording medium 103 in response to an instruction to activate the program. The CPU 101 implements functions of the image forming apparatus 10 according to programs stored in the memory 102. The network I/F 104 is used as an interface for connecting the image forming apparatus 10 to a network.

The display unit 108 is constituted by, for example, a Liquid Crystal Display (LCD), which displays an operation screen page or a message. The operations unit 109 is an input unit constituted by buttons (keys) that are hardware resources, for receiving operations/input from the user. The display unit 108 and the operations unit 109 may constitute a single unit, such as an operations panel.

The image processing unit 106 executes various image processing operations required for outputting (printing) image data. The image output unit 105 outputs (prints) the image data.

The external device I/F 107 is an interface for connecting the image forming apparatus 10 to a card reader 30 used for inputting user information used for authentication. The external device I/F 107 may be constituted by a USB port (USB host interface) or a serial port. The card reader 30 is for reading information from a card 50, and includes a hardware interface (for example, a USB connector or a serial interface) with which the card reader 30 can be connected to the external device I/F 107. The card reader 30 may be built in the image forming apparatus 10. The card reader 30 may be a contact type or a non-contact type reader. The card 50 is not limited to an IC card; for example, the card 50 may be a magnetic card, as long as a unique ID (card number) can be recorded in each card 50. A card ID is typically referred to as a Universal ID or a Card Serial Number. Examples of the card 50 are a Proximity card, a Mifare card, and a Java (registered trademark) card.

In the present embodiment, it is assumed that the card 50 is distributed to each user. However, in accordance with the security level required for the operations, plural users may share one card 50. The cards 50 distributed to the users do not need to be of the same type. As described above, the card reader 30 can be easily connected to the image forming apparatus 10 by a USB. Therefore, plural card readers 30 corresponding to different types of cards 50 (for example, a Proximity card, a Mifare card, and a Java (registered trademark) card) may be connected to the image forming apparatus 10 at the same time. In this case, plural types of cards 50 can be used at the same time.

As shown in FIG. 1, the image forming apparatus 10 is connected to a printing data transmission device 20 via a network (wired or wireless). In response to a print instruction from a user, the printing data transmission device 20 converts document data, which is the target of the print instruction, into printing data that can be interpreted by the image forming apparatus 10, and sends a print request (print job) corresponding to the printing data to the image forming apparatus 10.

Figure 2:
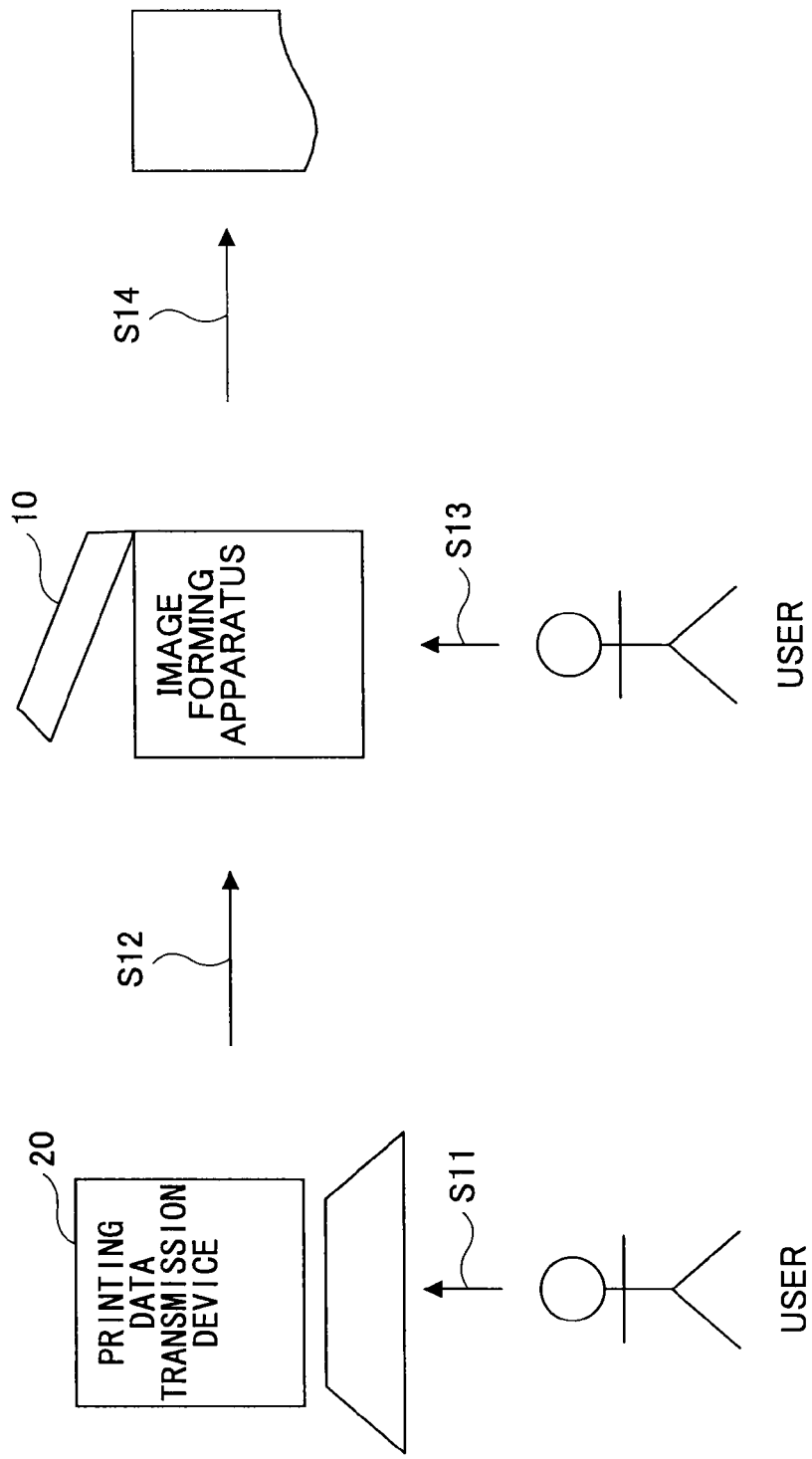
FIG. 2 schematically illustrates a confidential printing process.

In the present embodiment, the printing data transmission device 20 requests the image forming apparatus 10 to execute confidential printing. FIG. 2 schematically illustrates the confidential printing process.

When performing confidential printing, the user enters a user name (user ID) and a password to the printing data transmission device 20 (step S1). The printing data transmission device 20 generates printing data corresponding to the document data that is the target of printing, incorporates the user name and password to the printing data, and sends the printing data to the image forming apparatus 10 (step S12). When the printing data including the user name and password is received, the image forming apparatus 10 saves the printing data in the recording medium 103, instead of immediately executing a printing process. When the user logs into the image forming apparatus 10 and gives an instruction to print the saved printing data (step S13), the image forming apparatus 10 executes the process of printing the printing data (step S14).

Such a confidential printing process makes it possible to execute printing only when it is confirmed that the user who has given the printing instruction is close to the image forming apparatus 10. Accordingly, this process is particularly effective for preventing information leakage when printing a highly-confidential document.

Figure 3:
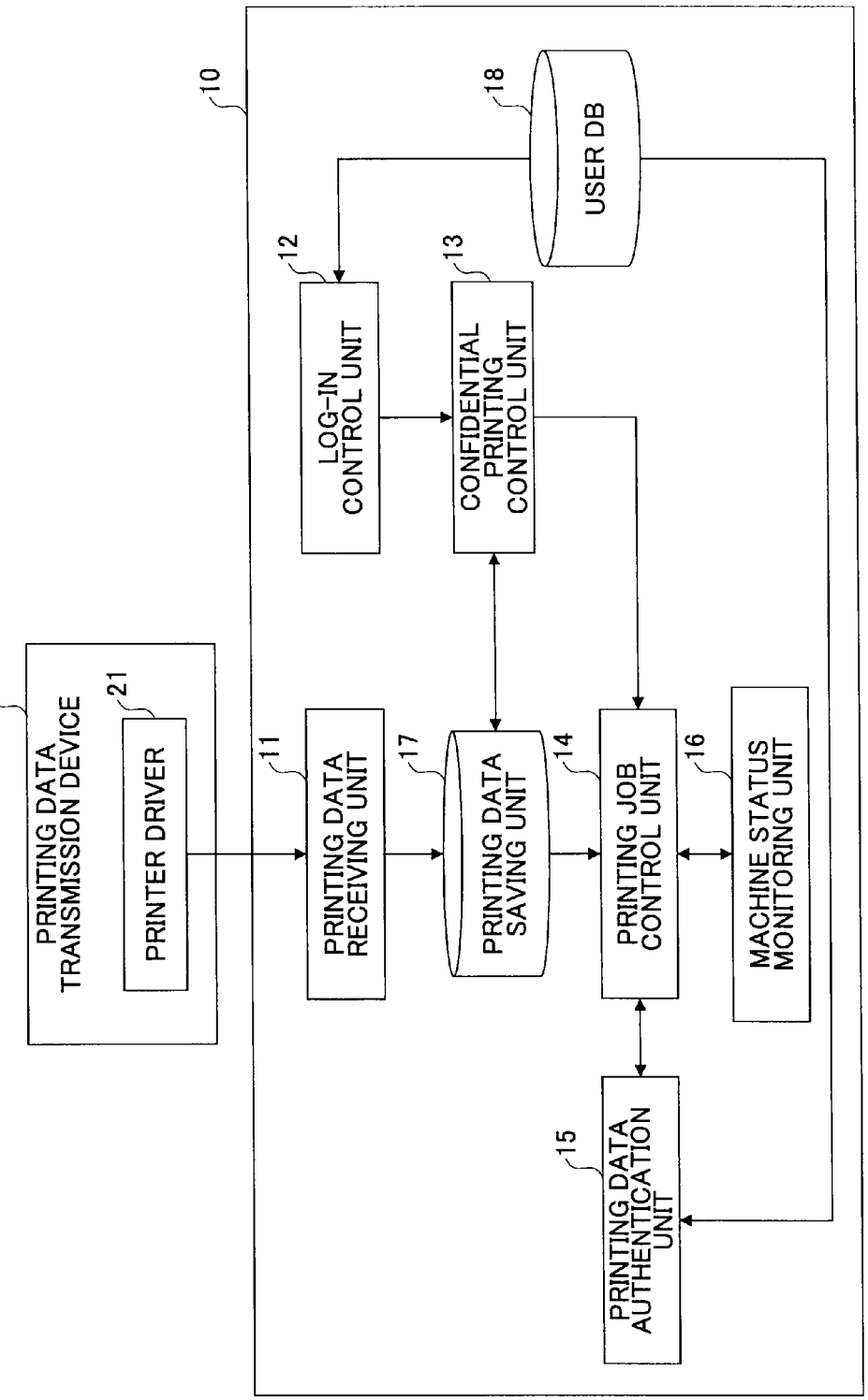
FIG. 3 illustrates the functional configuration of the image forming apparatus according to an embodiment of the present invention.

The image forming apparatus 10 has the following functional configuration for executing the confidential printing process. FIG. 3 illustrates the functional configuration of the image forming apparatus 10 according to an embodiment of the present invention. As shown in FIG. 3, the image forming apparatus 10 includes a printing data receiving unit 11, a log-in control unit 12, a confidential printing control unit 13, a printing job control unit 14, a printing data authentication unit 15, a machine status monitoring unit 16, a printing data saving unit 17, and a user data base (DB) 18. These units function according to programs installed in the image forming apparatus 10 for causing the CPU 101 to execute processes.

The printing data receiving unit 11 receives the printing data sent from the printing data transmission device 20, and saves the printing data in the printing data saving unit 17. The printing data saving unit 17 is a storage area for spooling the printing data, and is formed in, for example, the recording medium 103. The log-in control unit 12 controls a log-in process of the operator (user) for logging into the image forming apparatus 10. When performing the log-in process, the operator is authenticated based on a user name and a password registered in the user DB 18. The user DB 18 is for managing user information of each user with the use of the recording medium 103. The user name and the password are included in the user information. The user DB 18 can be managed in an integrated manner by computers connected to the image forming apparatus 10 via a network. The confidential printing control unit 13 controls the process of receiving, from the operator, a request to execute a printing job for printing data saved in the printing data saving unit 17. The printing job control unit 14 causes the image output unit 105 to print the printing data in response to a request to execute a printing job received by the confidential printing control unit 13. The printing data authentication unit 15 cross-checks the user name and password included in the printing data with the user name and password registered in the user DB 18. The printing data saving unit 17 monitors various statuses of the image forming apparatus 10, for example, the statuses of the trays (whether a tray is out of paper) and the statuses of toner of the respective colors (whether there is a toner shortage).

Figure 4:
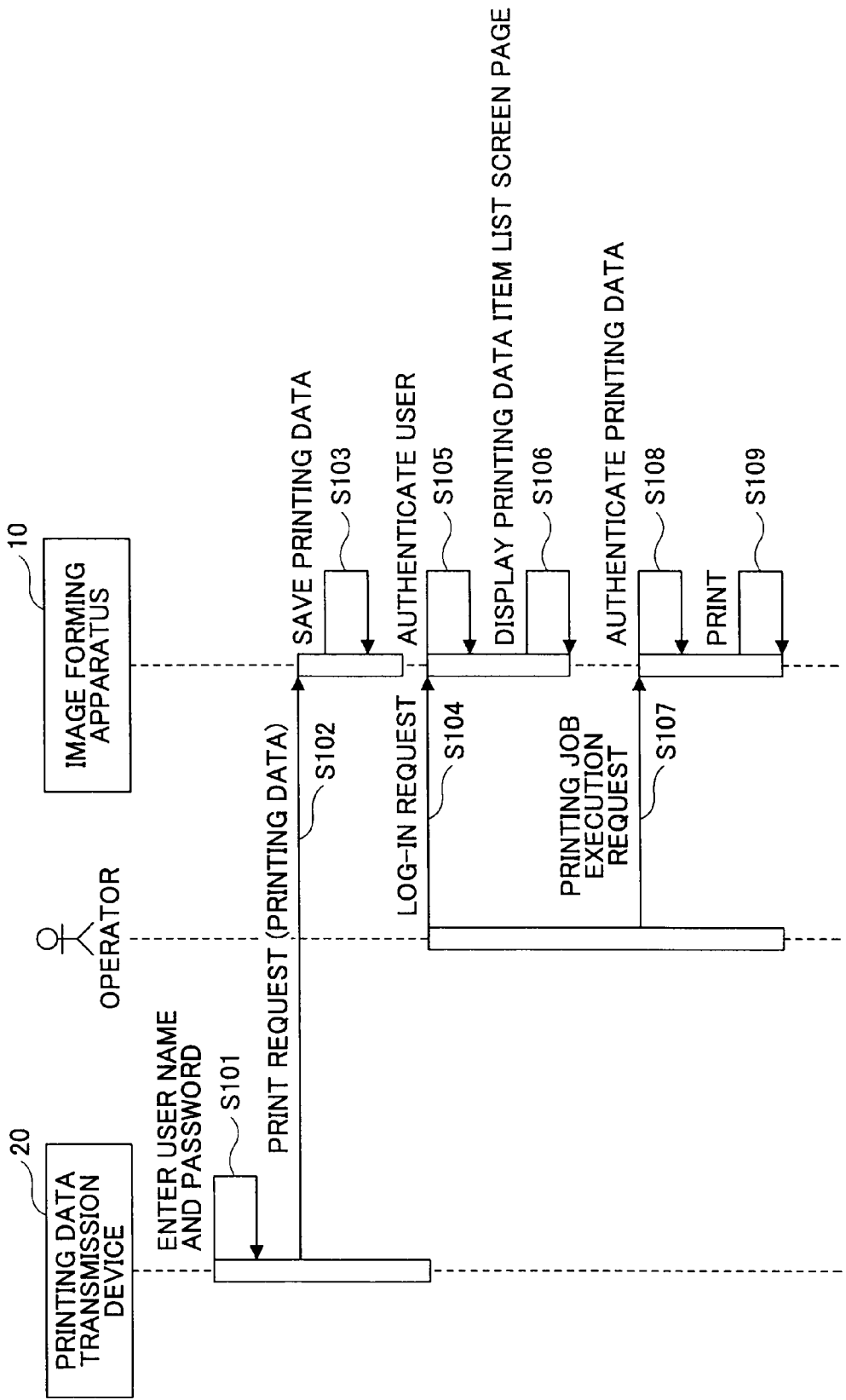
FIG. 4 is a sequence diagram for describing the process executed by the image forming apparatus according to an embodiment of the present invention.

A description is given of processing procedures performed by the image forming apparatus 10. FIG. 4 is a sequence diagram for describing the process executed by the image forming apparatus 10 according to an embodiment of the present invention.

In response to an input of a request to execute a confidential printing job, a printer driver 21 included in the printing data transmission device 20 prompts the user to enter a user name and a password (step S101). The user name and password are entered in an authentication information input screen page.

Figure 5:
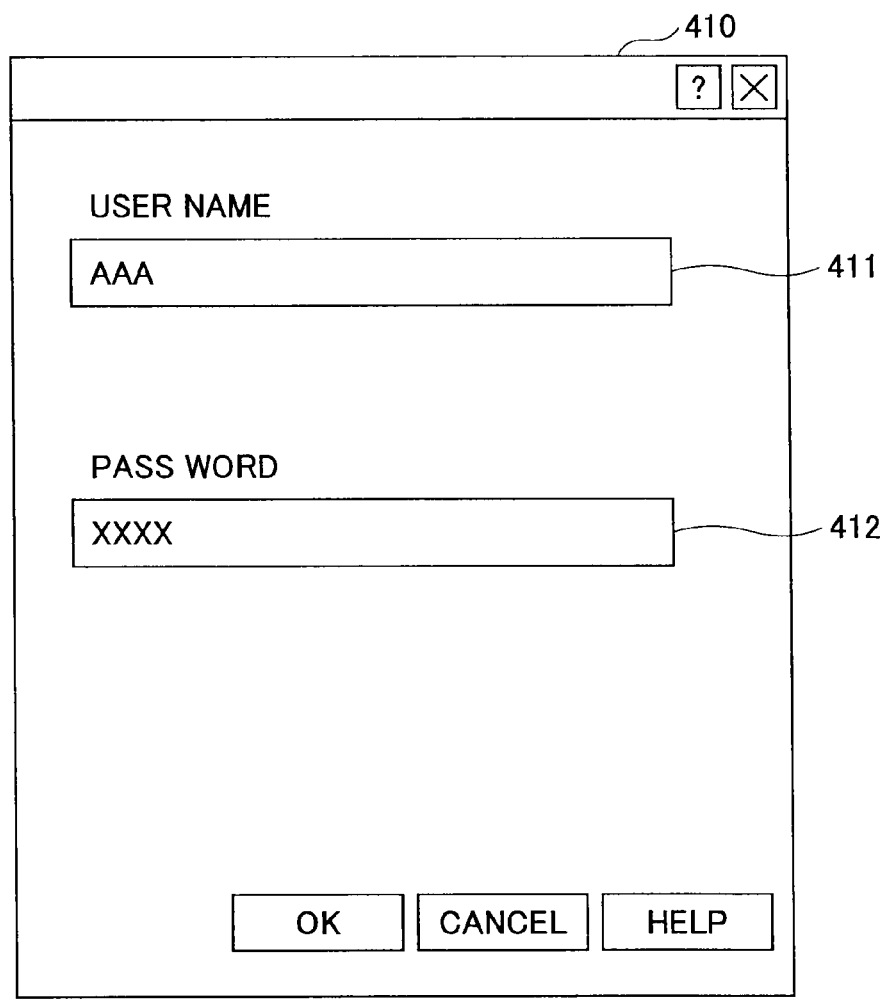
FIG. 5 illustrates an example of an authentication information input screen page displayed by a printer driver.

FIG. 5 illustrates an example of an authentication information input screen page displayed by the printer driver 21. As shown in FIG. 5, an authentication information input screen page 410 includes a user name input area 411 and a password input area 412. The printer driver 21 sets, in the printing data, the user name and password that have been entered in the authentication information input screen page 410, and sends the printing data to the image forming apparatus 10. The authentication information input screen page 410 is displayed when a predetermined button on a print setting screen page for setting printing conditions is pressed.

Next, the printer driver 21 generates printing data corresponding to document data which is the target of printing, sets the entered user name and password in the generated printing data, and sends the printing data to the image forming apparatus 10 (step S102).

When the printing data is received, the printing data receiving unit 11 of the image forming apparatus 10 saves the printing data in the printing data saving unit 17 (step S103). The printing job for the saved printing data is not executed at the same time as the printing data is received. That is, the printing job is in a locked state at this point.

Subsequently, when a user presses a log-in button disposed on the operations unit 109, as the operator of the image forming apparatus 10, the log-in control unit 12 displays a log-in screen page on the display unit 108.

Figure 6:
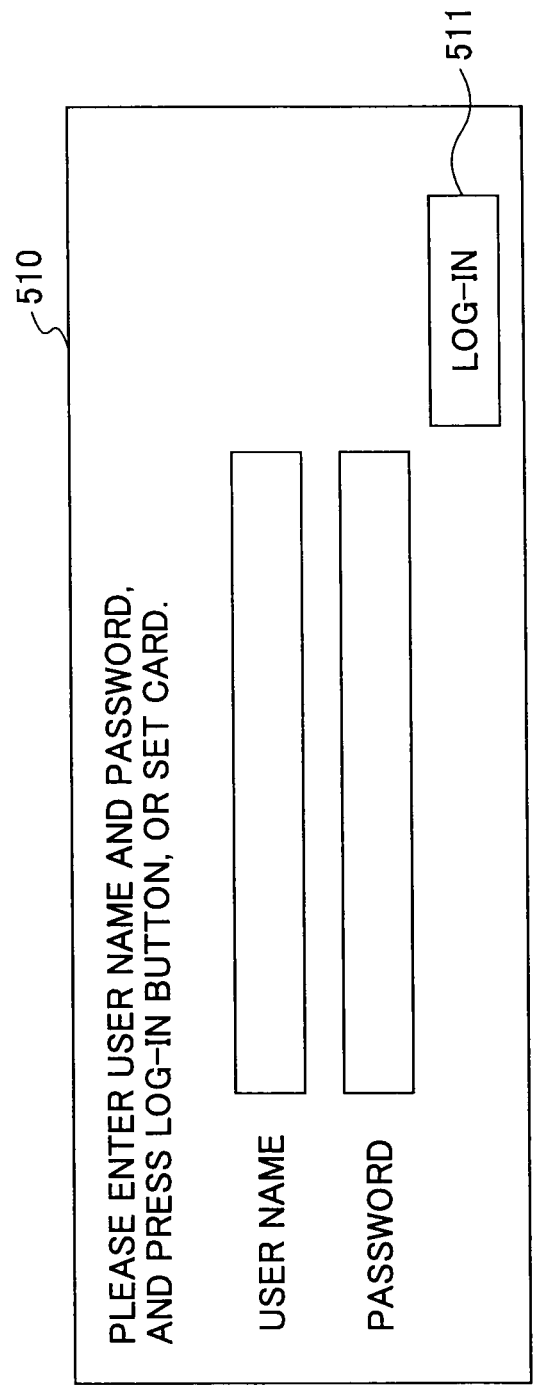
FIG. 6 illustrates a log-in screen page displayed by the image forming apparatus.

FIG. 6 illustrates a log-in screen page displayed by the image forming apparatus 10. As shown in FIG. 6, a log-in screen page 510 displays a message prompting the user to enter a user name and a password, or to set the card 50.

When the user sets the card 50 at the card reader 30 or when the user enters the user name and password in the log-in screen page 510 while the log-in screen page 510 is displayed on the display unit 108 (step S104), the log-in control unit 12 authenticates the user by cross-checking the user name and password identified by the card ID of the card reader 30 or the user name and password entered by the user, with a list of user names and passwords registered in the user DB 18 (step S105). When the authentication is unsuccessful, the log-in control unit 12 rejects the log-in of the user, and displays an error screen page on the display unit 108.

When the authentication is successful, the confidential printing control unit 13 searches the printing data saving unit 17 for printing data having the same user name as that of the authenticated user (hereinafter, "log-in user") specified therein (i.e., printing data for which the log-in user has made a confidential printing request), and causes the display unit 108 to display a screen page of a list of printing data items including the search-found printing data items (step S106).

FIG. 7 is an example of a displayed printing data item list screen page. As shown in FIG. 7, a printing data item list screen page 520 includes a printing data item list display area 521, a printing button 522, and a delete button 523.

The printing data item list display area 521 displays a list of (document names of) printing data items pertinent to the log-in user, among the printing data items saved in the printing data saving unit 17. When the delete button 523 is pressed, the confidential printing control unit 13 deletes the printing data items selected in the printing data item list display area 521 from the printing data saving unit 17. Accordingly, the printing jobs corresponding to the deleted printing data items are cancelled.

When the printing button 522 is pressed, the confidential printing control unit 13 requests the printing job control unit 14 to execute the printing jobs corresponding to one or more printing data items selected in the printing data item list display area 521 (step S107).

The printing job control unit 14 causes the printing data authentication unit 15 to authenticate the printing data that is set as a target of a printing job (step S108). The printing data authentication unit 15 authenticates the printing data by cross-checking the user name and password included in each printing data item with the list of user names and passwords registered in the user DB 18. When the printing data is authenticated, the printing job control unit 14 causes the image output unit 105 to print the printing data (step S109). When rights to the printing jobs are specified for each of the users in the user DB 18, the printing job control unit 14 may limit the execution of printing jobs in accordance with the rights. In one example, when the log-in user does not have the right to execute a certain printing job, the printing job control unit 14 may reject the execution of the printing job even if the corresponding printing data has been authenticated. In another example, when the log-in user does not have the right to execute color printing but the printing data is to be color-printed, the printing job control unit 14 may reject the execution of the printing job.

Figure 8:
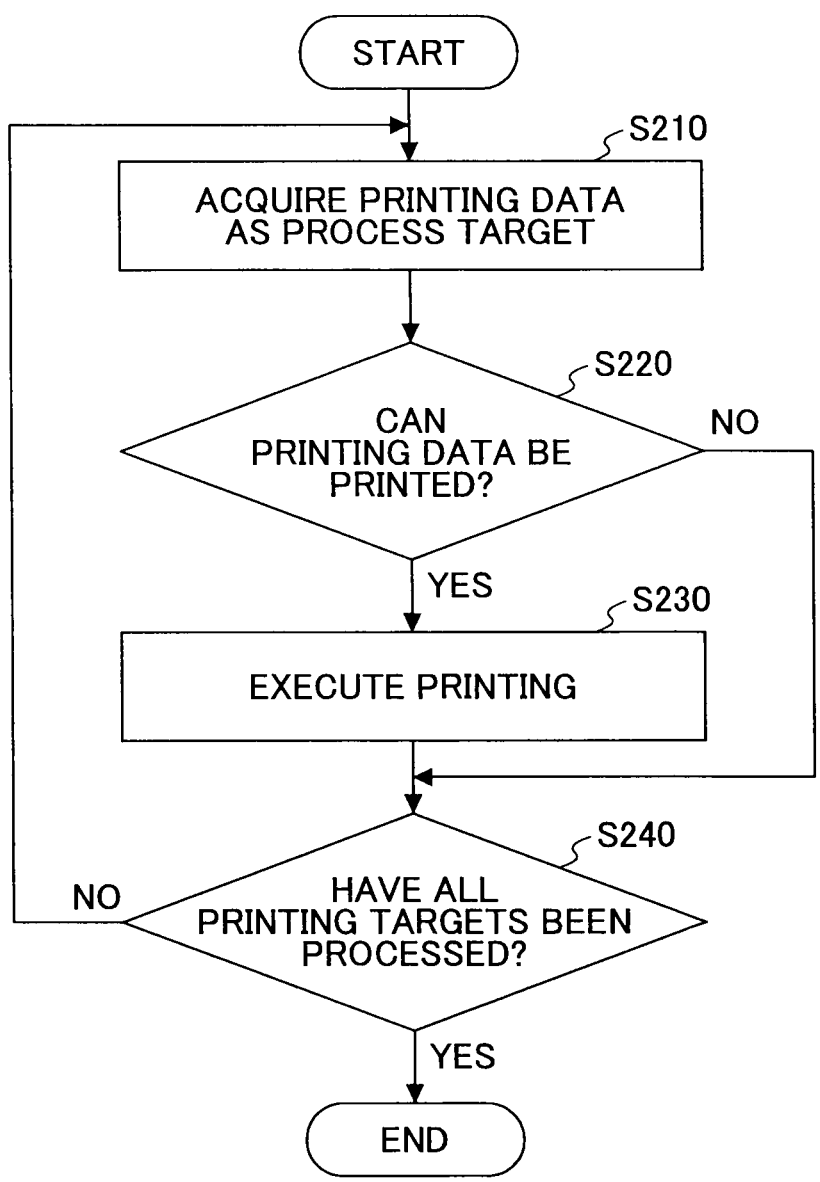
FIG. 8 is a flowchart for describing the processing procedures performed by a printing job control unit according to a first embodiment of the present invention.

Next, details of step S109 are described in detail. FIG. 8 is a flowchart for describing the processing procedures performed by the printing job control unit 14 according to a first embodiment of the present invention.

The printing job control unit 14 acquires one printing data item as the process target, from a list of printing data items specified as targets of printing jobs (hereinafter, "printing target list") (step S210). Next, the printing job control unit 14 refers to the machine status monitoring unit 16 to determine whether the image forming apparatus 10 is in a status for printing the printing data (whether the image forming apparatus 10 is in a status for satisfying the printing conditions specified in the printing data item) (step S220). When the printing job control unit 14 determines that the image forming apparatus 10 is in a status for printing the printing data (YES in step S220), the printing job control unit 14 executes the printing job of the printing data by controlling the image output unit 105 (step S230).

When the printing job control unit 14 determines that the image forming apparatus 10 is not in a status for printing the printing data (NO in step S220), the printing job control unit 14 skips (ignores) the printing job of the printing data. For example, when the sheet feeding tray specified in the printing data is out of paper, or there is a shortage in toner of a color that is used in the printing data, the printing job control unit 14 determines that the image forming apparatus 10 is not in a status for printing the printing data.

After step S230, or when the determination made at step S220 is NO, the printing job control unit 14 determines whether there is a printing data item that has not been processed remaining in the printing target list (step S240). When there is an unprocessed printing data item remaining in the printing target list (NO at step S240), the process from step S210 onward is subsequently executed for the unprocessed printing data item. Therefore, the printing job control unit 14 can continue to execute jobs for subsequent printing data items. When there is no unprocessed printing data item (YES at step S240), the process ends.

Figure 9:
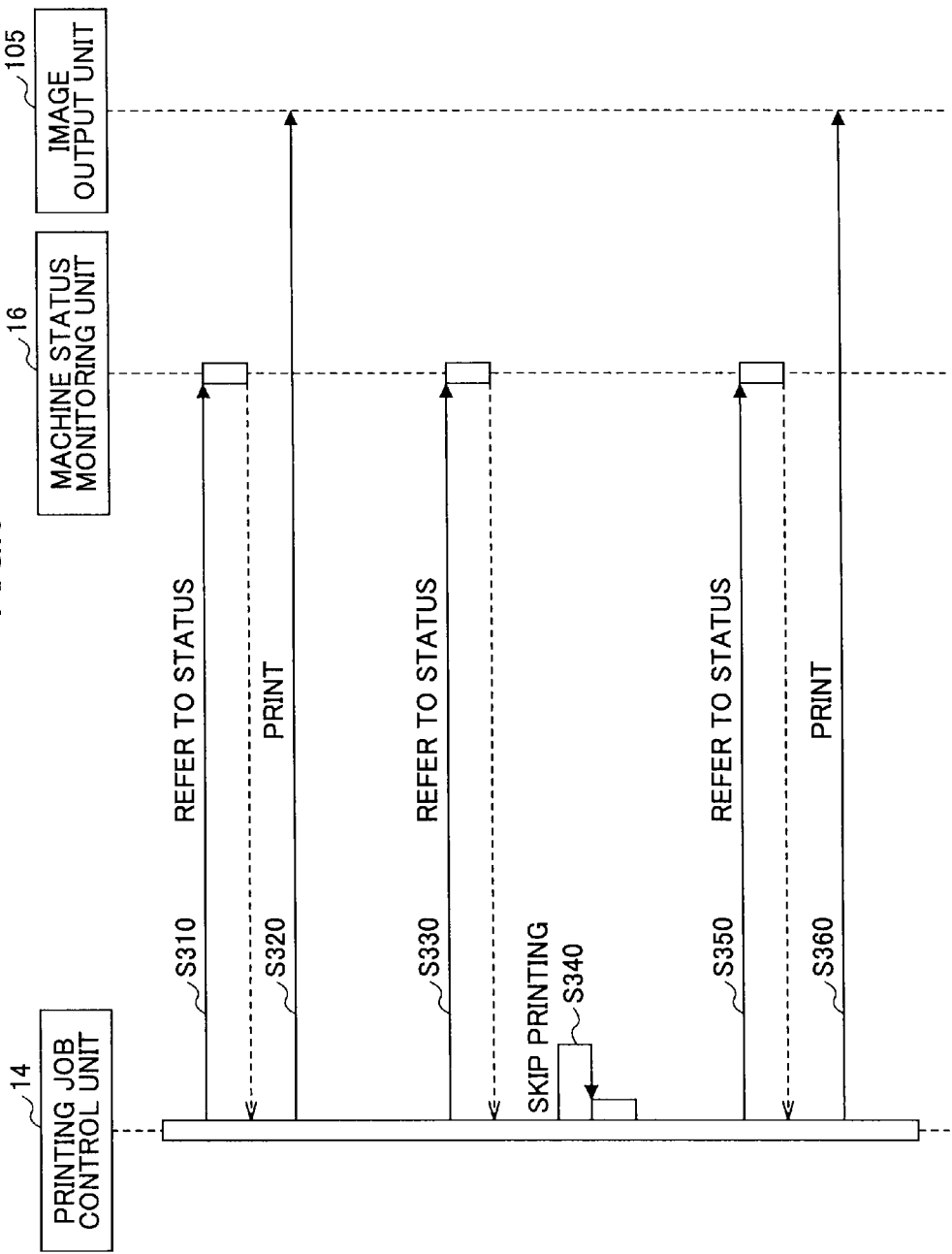
FIG. 9 is a sequence diagram for describing a specific example of the process performed by the printing job control unit according to the first embodiment.

A description is given of the processing procedures of FIG. 8 applied to a specific example. FIG. 9 is a sequence diagram for describing a specific example of the process performed by the printing job control unit 14 according to the first embodiment. In FIG. 9, it is assumed that there are three printing data items selected as printing targets in the printing data item list screen page 520 (see FIG. 7) (i.e., three printing data items are included in the printing target list). The sheet sizes specified in the three printing data items are letter size, A4 size, and letter size, respectively. In FIG. 9, it is assumed that the A4 sheet feeding tray in the image forming apparatus 10 is out of paper.

The printing job control unit 14 sets the first printing data item corresponding to letter size as the process target, and refers to the machine status monitoring unit 16 to determine the status of the letter size sheet feeding tray in the image forming apparatus 10 (step S310). The result of reference (status information) indicates that the letter size is not out of paper, and therefore the printing job control unit 14 causes the image output unit 105 to print this printing data (step S320).

The printing job control unit 14 sets the second printing data item corresponding to A4 size as the process target, and refers to the machine status monitoring unit 16 to determine the status of the A4 size sheet feeding tray in the image forming apparatus 10 (step S330). The result of reference (status information) indicates that the A4 size is out of paper, and therefore the printing job control unit 14 skips the printing job of this printing data (step S340).

The printing job control unit 14 sets the third printing data item corresponding to letter size as the process target, and refers to the machine status monitoring unit 16 to determine the status of the letter size sheet feeding tray in the image forming apparatus 10 (step S350). The result of reference (status information) indicates that the letter size is not out of paper, and therefore the printing job control unit 14 causes the image output unit 105 to print this printing data (step S360).

As described above, while printing plural printing data items by a confidential printing method, even if one or more of the printing data items cannot be printed, the image forming apparatus 10 according to the first embodiment can skip the printing data item that cannot be printed and continue with the other printing jobs. Therefore, printing jobs of printing data items that can be printed are prevented from being cancelled even when there is a printing data item that cannot be printed.

Figure 10:
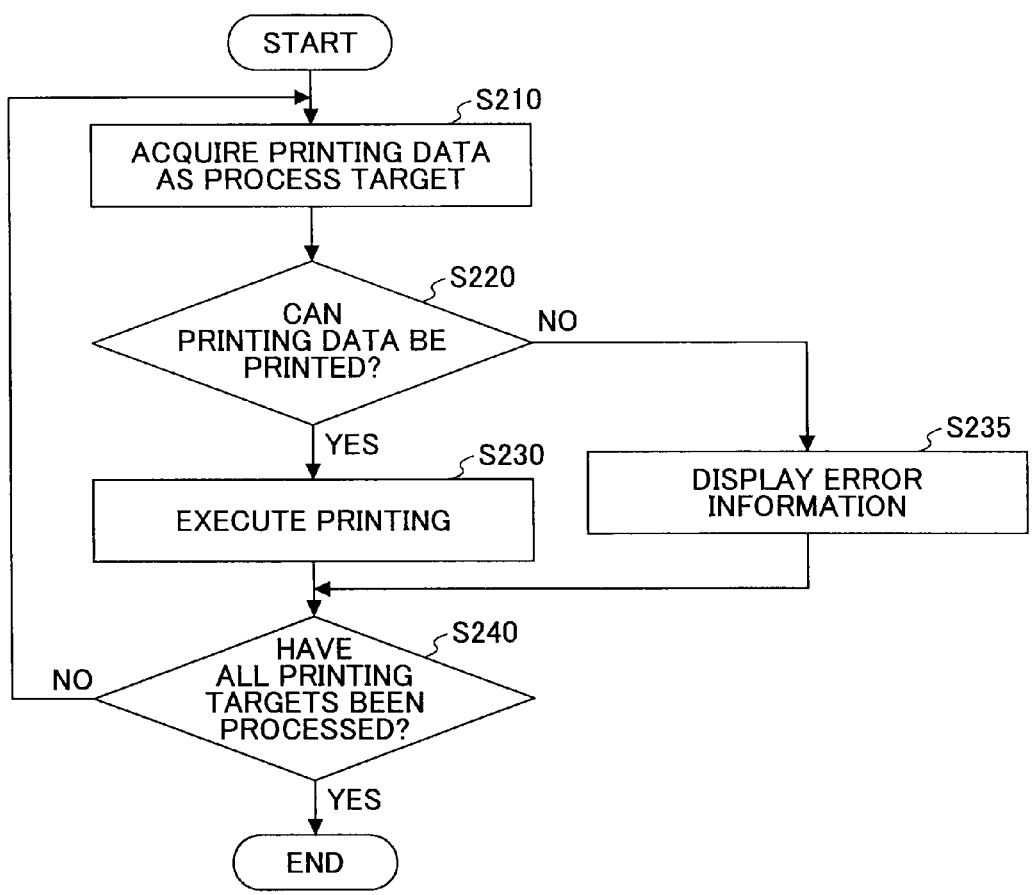
FIG. 10 is a flowchart for describing the processing procedures performed by the printing job control unit according to a second embodiment of the present invention.

Next, a description is given of a second embodiment according to the present invention. FIG. 10 is a flowchart for describing the processing procedures performed by the printing job control unit 14 according to the second embodiment of the present invention. In FIG. 10, steps corresponding to those in FIG. 8 are denoted by the same reference numbers, and are not further described.

In FIG. 10, when the printing job control unit 14 determines that the image forming apparatus 10 is not in a status for printing the printing data that is the process target (NO in step S220), the printing job control unit 14 causes the display unit 108 to display information (error information) indicating that the printing data cannot be printed and the reason why (paper shortage or toner shortage) (step S235).

After displaying the error information, the printing job control unit 14 continues with the process for the other printing data items (step S240).

Figure 11:
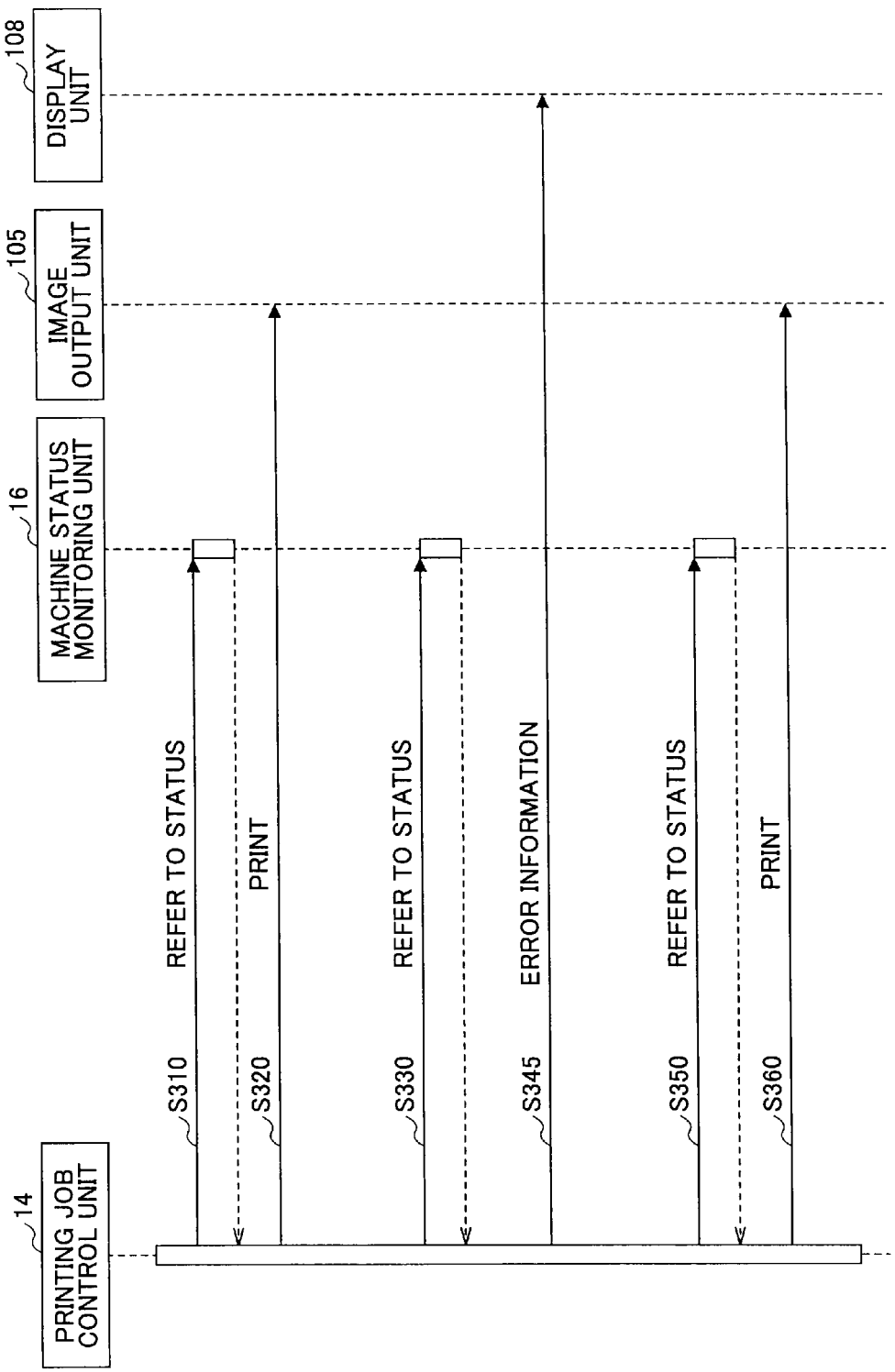
FIG. 11 is a sequence diagram for describing a specific example of the process performed by the printing job control unit according to the second embodiment.

A description is given of the processing procedures of FIG. 10 applied to a specific example. FIG. 11 is a sequence diagram for describing a specific example of the process performed by the printing job control unit 14 according to the second embodiment. In FIG. 11, steps corresponding to those in FIG. 9 are denoted by the same reference numbers, and are not further described.

In FIG. 11, step S345 is executed instead of step S340. In step S345, the printing job control unit 14 causes the display unit 108 to display error information indicating that printing cannot be performed because the A4 sheet feeding tray is out of paper. Then, the printing job control unit 14 continues to execute step S350 and onward for another printing data item.

As described above, when a printing data item that cannot be printed is included among the printing targets, the image forming apparatus 10 according to the second embodiment can display error information regarding the corresponding printing data item. Accordingly, the user can recognize, from the error information, that the printing job has been unsuccessful due to an error, and can thus perform recovery operations.

Figure 12:
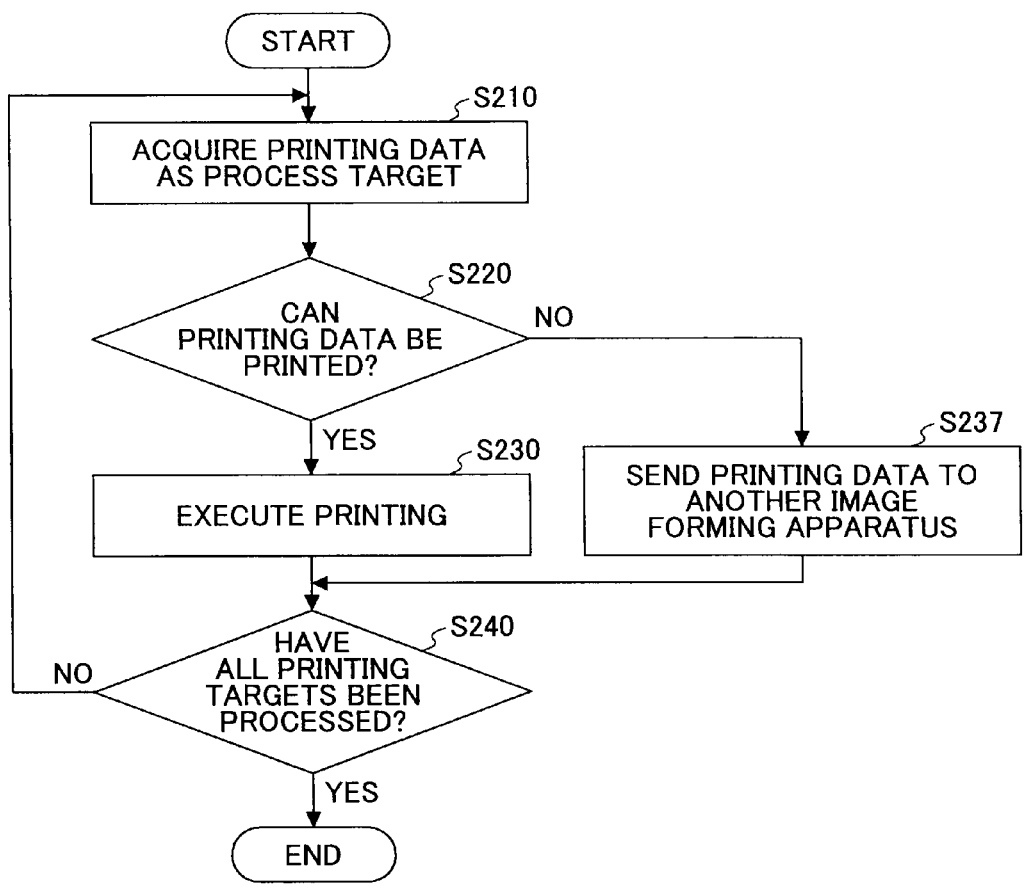
FIG. 12 is a flowchart for describing the processing procedures performed by the printing job control unit according to a third embodiment of the present invention.

Next, a description is given of a third embodiment according to the present invention. FIG. 12 is a flowchart for describing the processing procedures performed by the printing job control unit 14 according to the third embodiment of the present invention. In FIG. 12, steps corresponding to those in FIG. 8 are denoted by the same reference numbers, and are not further described.

In FIG. 12, when the printing job control unit 14 determines that the image forming apparatus 10 is not in a status for printing the printing data that is the process target (NO in step S220), the printing job control unit 14 sends the printing data to another image forming apparatus and causes the other image forming apparatus to print the printing data (step S237).

After sending the printing data, the printing job control unit 14 continues with the process for the next printing data item (step S240).

Figure 13:
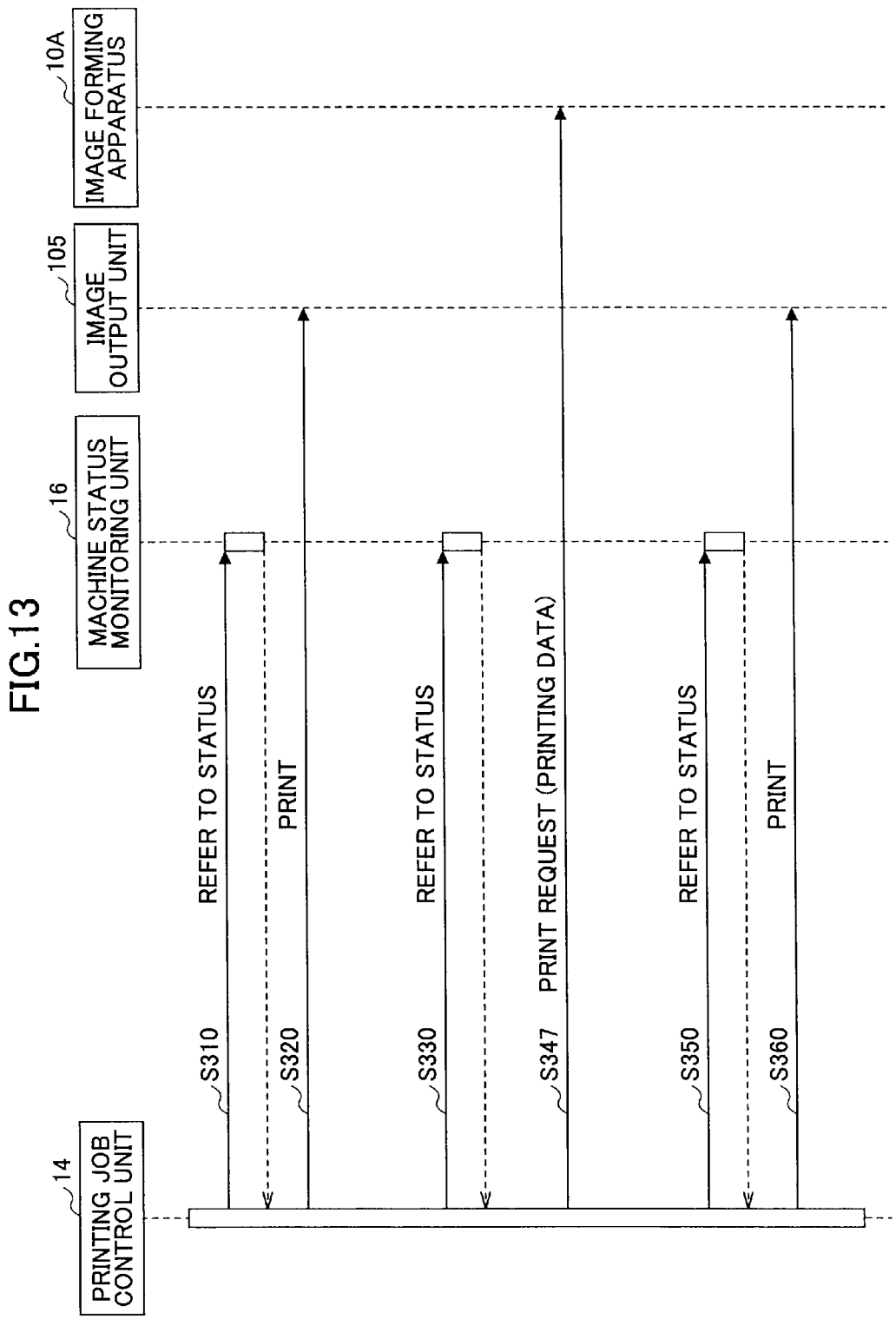
FIG. 13 is a sequence diagram for describing a specific example of the process performed by the printing job control unit according to the third embodiment.

A description is given of the processing procedures of FIG. 12 applied to a specific example. FIG. 13 is a sequence diagram for describing a specific example of the process performed by the printing job control unit 14 according to the third embodiment. In FIG. 13, steps corresponding to those in FIG. 9 are denoted by the same reference numbers, and are not further described.

In FIG. 13, step S347 is executed instead of step S340. In step S347, the printing job control unit 14 sends the printing data corresponding to A4 size sheets to an image forming apparatus 10A, and causes the image forming apparatus 10A to print the printing data. Then, the printing job control unit 14 continues to execute step S350 and onward for another printing data item.

As described above, while printing plural printing data items by a confidential printing method, even if one of the printing data items cannot be printed, the image forming apparatus 10 according to the third embodiment can cause another image forming apparatus to print the printing data.

The image forming apparatus to which the printing data is sent can be specified in advance (case A), or can be specified by the user at the timing when it is detected that printing cannot be performed (case B). Alternatively, the printing job control unit 14 may automatically search for an image forming apparatus to which the printing job control unit 14 is connected via a network, and send the printing data to a search-found image forming apparatus (case C). In any of these cases, the status of the image forming apparatus to which the printing data is to be sent may be referred to with the use of a network protocol such as HyperText Transfer Protocol (HTTP) or Simple Network Management Protocol (SNMP), and the printing data may be sent upon determining whether the destination image forming apparatus can print the printing data. In case A and case C, the image forming apparatus 10 may display a message on the display unit 108 that the printing data has been sent to another image forming apparatus, and an ID name of the other image forming apparatus.

The operator of the image forming apparatus 10 according to the present invention may log in by setting the card 50 at the card reader 30. The following is a description of the configuration and the processing procedures performed by the log-in control unit 12 for implementing log-in (card authentication) with the card 50.

Figure 14:
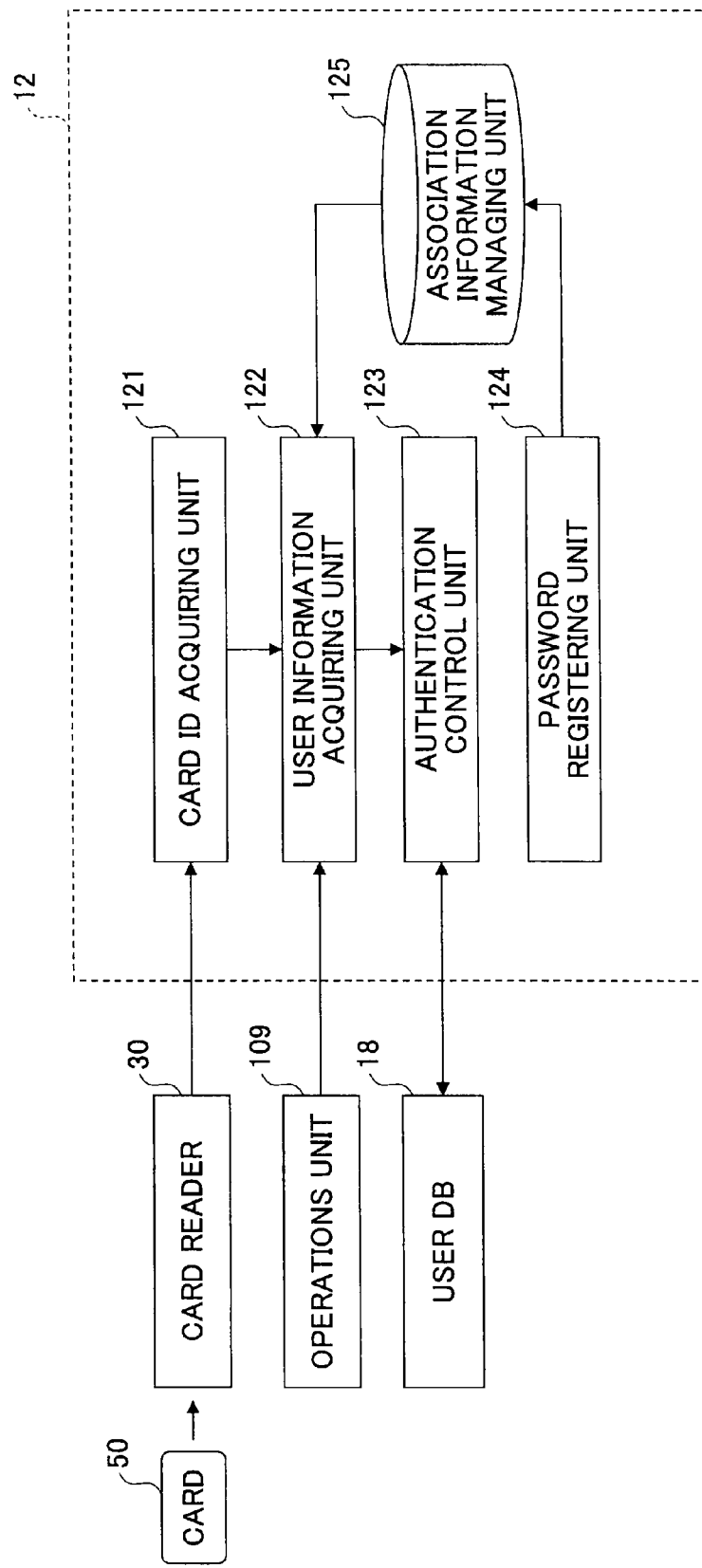
FIG. 14 illustrates a configuration of a log-in control unit.

FIG. 14 illustrates a configuration of the log-in control unit 12. As shown in FIG. 14, the log-in control unit 12 includes a card ID acquiring unit 121, a user information acquiring unit 122, an authentication control unit 123, a password registering unit 124, and an association information managing unit 125.

The card ID acquiring unit 121 acquires, from the card reader 30, a card ID that the card reader 30 has read from the card 50. The user information acquiring unit 122 acquires, from the association information managing unit 125, a user name corresponding to the card ID acquired by the card ID acquiring unit 121, and acquires, from the operations unit 109, a password that has been entered in the operations unit 109 by the user. The association information managing unit 125 is a storage area in the recording medium 103 for managing the association information for associating card IDs with user information. The authentication control unit 123 executes a process of authenticating an operator (user) based on the user name and password acquired by the user information acquiring unit 122, with user information registered in the user DB 18. The password registering unit 124 registers a password in association with a card ID in the association information managing unit 125, for the purpose eliminating the trouble of entering a password every time the authentication is performed. Accordingly, when a password is registered in the association information managing unit 125, the user information acquiring unit 122 acquires a password associated with a card ID from the association information managing unit 125, instead of from the operations unit 109.

Figure 15A:
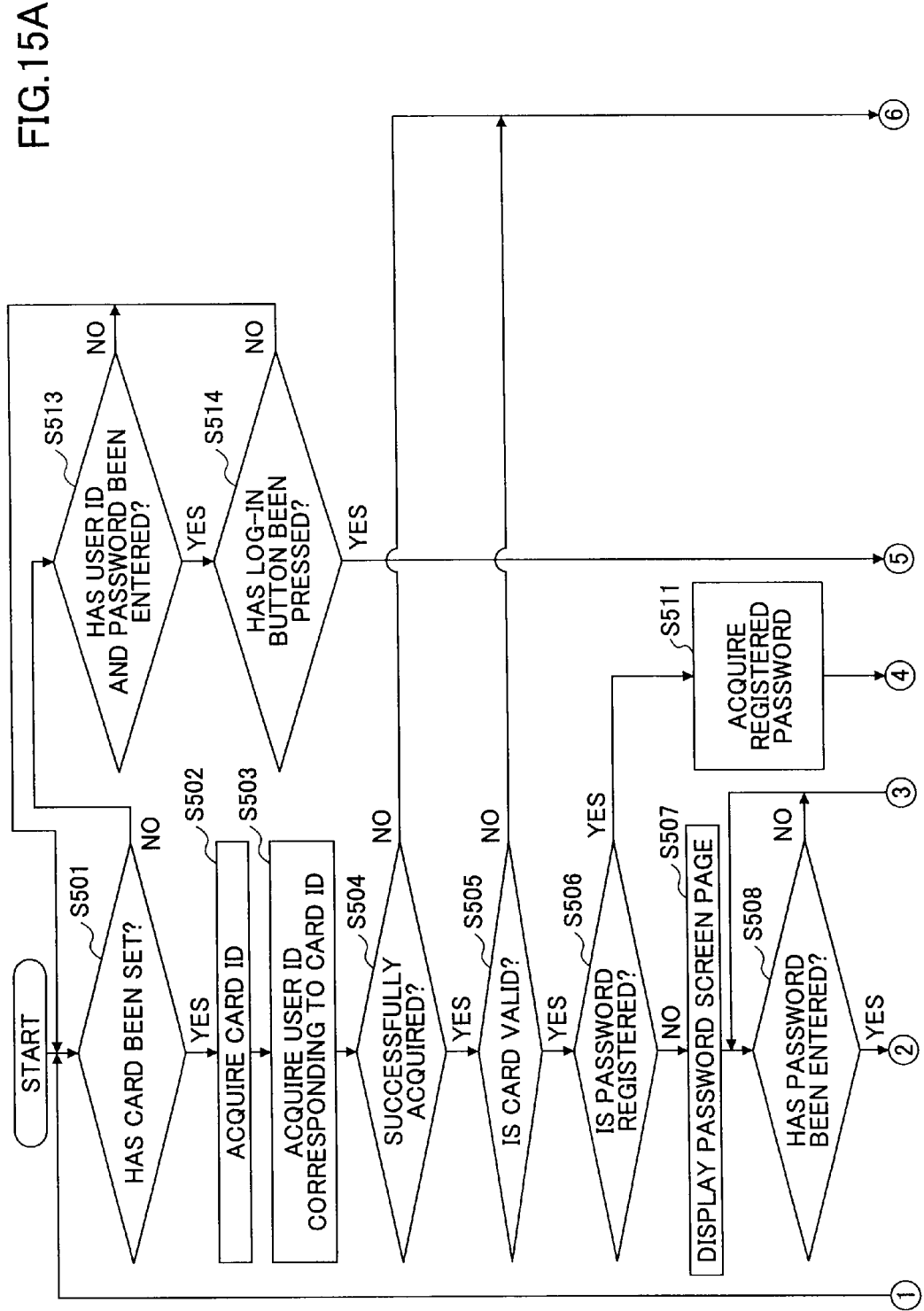

A description is given of the processing procedures performed by the log-in control unit 12. FIGS. 15A and 15B show a flowchart for describing the processing procedures performed by the log-in control unit 12.

When the user sets the card 50 at the card reader 30 while the user information acquiring unit 122 is causing the display unit 108 to display the log-in screen page 510 (see FIG. 6) (YES in step S501), the card ID acquiring unit 121 acquires, from the card reader 30, a card ID that the card reader 30 has read from the card 50 (step S502). Setting the card 50 at the card reader 30 means to cause the card reader 30 to read the information recorded in the card 50 by inserting the card 50 in the card reader 30 or by holding the card 50 over the card reader 30.

Next, the user information acquiring unit 122 acquires, from the association information managing unit 125, a user name associated with the acquired card ID (hereinafter, "current card ID") (step S503).

FIG. 16 illustrates an example of the association information managed by the association information managing unit 125. As shown in FIG. 16, in association information 170, a user name, a card ID, a password, and the validity of the card are held in association with each other for each user. Accordingly, in step S503, the user information acquiring unit 122 acquires, from the association information managing unit 125, the user name that is associated with the current card ID in the information managing unit 125. The card validity is information indicating the validity of the card 50. When the card 50 is valid, the authentication performed with the use of the corresponding card ID is deemed to be valid. When the card 50 is invalid, the authentication performed with the use of the corresponding card ID is deemed to be invalid.

The password does not need to be registered in the association information managing unit 125. When a password is registered in association with the current card ID, the user information acquiring unit 122 displays, in the log-in screen page 510, symbols (for example, "*********") indicating that it is not necessary to enter a password in the password entry field.

When a user name cannot be acquired (NO in step S504), the user information acquiring unit 122 determines that an authentication error has occurred. When a user name is acquired (YES in step S504), the user information acquiring unit 122 refers to the value (valid or invalid) indicating the card validity that is associated with the current card ID, to determine whether the card 50 is valid (step S505). When the card 50 is invalid (NO in step S505), the user information acquiring unit 122 determines that an authentication error has occurred.

When the card 50 is valid (YES in step S505), the user information acquiring unit 122 determines whether a password is registered in association with the current card ID in the association information managing unit 125 (step S506).

Figure 17:
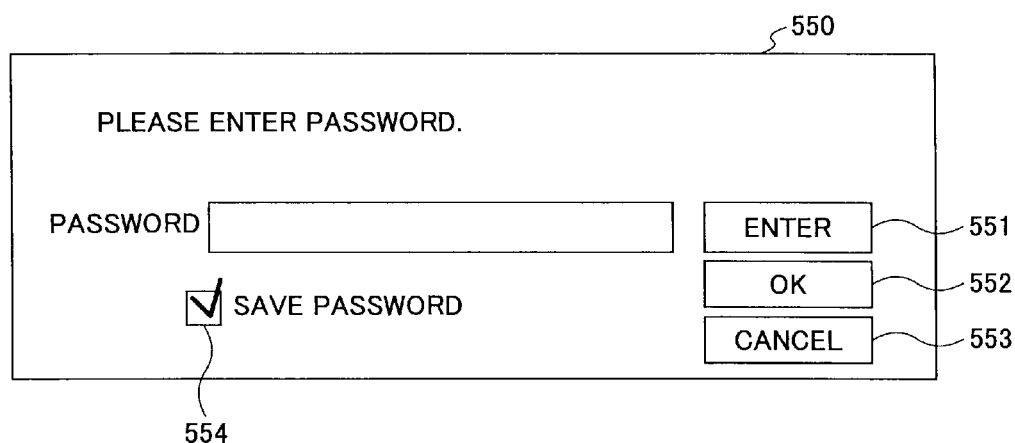
FIG. 17 illustrates an example of a password screen page.

When a password is not registered (NO in step S506), the user information acquiring unit 122 causes the display unit 108 to display a password screen page 550 shown in FIG. 17 (step S507). The user presses an input button 551 of the password screen page 550, and enters a password (YES in step S508). Then, the user does not press a cancel button 553 (NO in step S509), but presses an OK button 552 (YES in step S510). Accordingly, the authentication control unit 123 executes the authentication process by cross-checking the user name acquired at step S503 and the password entered at step S508 with a user name and a password registered in the user DB 18 (step S512).

Meanwhile, when a password is registered in association with the current card ID in the association information managing unit 125 (YES in step S506), the user information acquiring unit 122 acquires the password (step S511). Then, the authentication control unit 123 executes the authentication process by cross-checking the user name acquired at step S503 and the password acquired at step S511 with the user name and password registered in the user DB 18 (step S512).

When the authentication is successful (YES in step S516), the password registering unit 124 determines whether it is necessary to register (save) the password entered in the password screen page 550, based on the status of a tick box 554 of the password screen page 550 (step S517). When the tick box 554 is ticked (YES in step S517), the password registering unit 124 registers the password in association with the current card ID, in the association information managing unit 125 (step S518). Meanwhile, when the tick box 554 is not ticked (NO in step S517), the password registering unit 124 deletes the password registered in association with the current card ID in the association information managing unit 125 (step S519). However, when a password is not registered in association with the current card ID, the deleting process is unnecessary.

When the log-in screen page 510 is displayed, the card 50 is not set at the card reader 30 (NO in step S501), but a user name and, according to need, a password are entered in the log-in screen page 510 (YES in step S513), and a log-in button 511 is pressed (YES at step S514). A description is given of such a case. In this case, the user information acquiring unit 122 acquires the user name and password entered in the log-in screen page 510 (however, when a password is registered in association with the current card ID, the corresponding password is acquired), and the authentication control unit 123 executes the authentication process by cross-checking the acquired user name and password with the user name and password registered in the user DB 18 (step S515). Subsequently, the process from step S516 onward is executed.

In step S516, when the authentication is unsuccessful (NO in step S516), the user information acquiring unit 122 determines whether the password used for the authentication is registered in the association information managing unit 125 (step S520). When a password registered in the association information managing unit 125 (hereinafter, "registered password") is used, information indicating that a registered password has been used is recorded in the memory 102. The determination at step S520 can be made by referring to this recorded information. When the password used for authentication is not a registered password (NO in step S520), the authentication control unit 123 determines that an authentication error has occurred.

When the password used for authentication is a registered password (YES in step S520), the user information acquiring unit 122 causes the display unit 108 to display the password screen page 550 once again, and prompts the user to enter a new password (step S521). The following describes why the user is prompted to enter a password once again when the authentication is unsuccessful with a registered password.

In recent years, passwords are periodically changed for the purpose of enhancing security. Therefore, there may be cases where the password in the user DB 18 is renewed but the password registered in the association information managing unit 125 is old. In order to address such non-conformance in a simple manner, the user is given an opportunity to enter a new password (changed password) in step S521.

When a password is entered in the password screen page 550 that has been displayed once again, the user information acquiring unit 122 acquires the password entered in the password screen page 550, and the authentication control unit 123 executes the authentication process by cross-checking the user name acquired at step S503 and the entered password with a user name and a password registered in the user DB 18 (step S522).

When the authentication is unsuccessful (NO at step S523), the authentication control unit 123 determines that an authentication error has occurred. When the authentication is successful (YES at step S523), the process from step S517 onward is executed. Therefore, when the tick box 554 is ticked, the password registered in the association information managing unit 125 is renewed to a new password.

As described above, the image forming apparatus 10 manages the association information for associating a card ID with a user name, and can thus determine what the user name is based on the card ID. Furthermore, the authentication performed by the image forming apparatus 10 not only requires the user to set a card ID, but also to enter a password. Therefore, even if the card 50 only has a card ID recorded, the card 50 can implement an authentication process with the same security level as a high-performance IC card which uses a Personal Identification Number (PIN).

Furthermore, the image forming apparatus 10 can save a password in association with a card ID, and the password can be used for authentication. Therefore, the user is saved of the trouble of entering a password when using the card 50, thereby enhancing convenience.

When the registered password does not conform with the password managed in the user DB 18, the user is given the opportunity to enter a new password during the course of the authentication process. Therefore, the passwords can be maintained consistent in the system in a simple manner.

The present invention is not limited to the specifically disclosed embodiment, and variations and modifications may be made without departing from the scope of the present invention.

The present application is based on Japanese Priority Patent Application No. 2008-222127, filed on Aug. 29, 2008, the entire contents of which are hereby incorporated herein by reference.

What is claimed is:
1. An image forming apparatus, comprising:
an information management unit configured to store first card identification information corresponding to first user identification information;
a user information storing unit configured to store user information for user authentication;
a first receiving unit configured to receive second card identification information;
a second receiving unit configured to receive a first password;

an acquiring unit configured to acquire the first user identification information corresponding to the second card identification information in the information management unit;

a first authentication unit configured to execute an authentication process of the first user identification information and the first password based on the user information;

a request receiving unit configured to receive a request of executing a job when the authentication process is successful;

a monitoring unit configured to monitor a status of the apparatus;

a determining unit configured to determine whether the apparatus is in a status for executing the requested job on each of at least one of the data items that is set as a target of the job based on the status of the apparatus; and an executing unit configured to execute the requested job on the data item for which the determining unit determines that the apparatus is in a status for executing the requested job.

2. The image forming apparatus according to claim 1, further comprising:

a second authentication unit configured to execute an authentication process of second user identification data and a second password included in each of the data items that is set as a target of the job based on the user information;

wherein the executing unit is configured to execute the requested job on the data whose second user identification data and second password are authenticated by the second authentication unit.

3. The image forming apparatus according to claim 2, further comprising:

a first control unit configured to limit execution of the job according to a right to execute the job for which the execution request is received by the request receiving unit, wherein the user information storing unit further stores right information of users, and the first control unit limits execution of the job according to whether there is a right to execute the received job, based on the right information of the user authenticated by the first authentication unit.

4. The image forming apparatus according to claim 3, wherein when there is no right to execute the received job, the first control unit rejects execution of the job even when the data item is authenticated by the second authentication unit.

5. The apparatus according to claim 3, further comprising:

a second control unit configured to limit execution of the job according to a right to execute printing conditions of the at least one data item that is set as a target of the job for which the execution request is received by the request receiving unit, based on the right information of the user authenticated by the first authentication unit.

6. A method performing by an apparatus, the method comprising:

storing first card identification information corresponding to first user identification information;

storing user information for user authentication;

receiving second card identification information;

receiving a first password;

acquiring the first user identification information corresponding to the second card identification information;

executing an authentication process of the first user identification information and the first password based on the user information;

receiving a request of executing a job when the authentication process is successful;

monitoring a status of the apparatus;

determining whether the apparatus is in a status for executing the requested job on each of at least one of the data items that is set as a target of the job based on the status of the apparatus; and executing the requested job on the data item for which the determining step determines that the apparatus is in a status for executing the requested job.

7. The method of claim 6, further comprising:

executing an authentication process of second user identification data and a second password included in each of the data items that is set as a target on the job based on the user information, wherein the step of executing the requested job includes executing the requested job on the data whose second user identification data and second password are authenticated.

8. The method of claim 7, further comprising:

limiting execution of the job according to a right to execute the job for which the execution request is received, wherein the step of storing the user information includes storing right information of users, and the limiting step includes limiting execution of the job according to whether there is a right to execute the received job, based on the right information of the user authenticated by the authentication process.

9. The method of claim 8, wherein the limiting step comprises rejecting execution of the job even when the data item is authenticated, when there is no right to execute the received job.

10. The method of claim 8, further comprising:

limiting execution of the job according to a right to execute printing conditions of the at least one data item that is set as a target of the job for which the execution request is received, based on the right information of the user authenticated by the authentication process.

11. A non-transitory computer-readable medium storing program instructions that, when executed by a computer, cause the computer to execute a method, the method comprising:

storing first card identification information corresponding to first user identification information;

storing user information for user authentication;

receiving second card identification information;

receiving a first password;

acquiring the first user identification information corresponding to the second card identification information;

executing an authentication process of the first user identification information and the first password based on the user information;

receiving a request of executing a job when the authentication process is successful;

monitoring a status of an apparatus;

determining whether the apparatus is in a status for executing the requested job on each of at least one of the data items that is set as a target of the job based on the status of the apparatus; and executing the requested job on the data item for which the determining step determines that the apparatus is in a status for executing the requested job.

12. The computer-readable medium of claim 11, further comprising:

executing an authentication process of second user identification data and a second password included in each of the data items that is set as a target on the job based on the user information, wherein the step of executing the requested job includes executing the requested job on the data whose second user identification data and second password are authenticated.

13. The computer-readable medium of claim 12, further comprising:
limiting execution of the job according to a right to execute the job for which the execution request is received, wherein
the step of storing the user information includes storing right information of users, and
the limiting step includes limiting execution of the job according to whether there is a right to execute the received job, based on the right information of the user authenticated by the authentication process.

14. The computer-readable medium of claim 13, wherein the limiting step comprises rejecting execution of the job even when the data item is authenticated, when there is no right to execute the received job.

15. The computer-readable medium of claim 13, further comprising:
limiting execution of the job according to a right to execute printing conditions of the at least one data item that is set as a target of the job for which the execution request is received, based on the right information of the user authenticated by the authentication process.

* * * * *